Dec. 20, 1955  L. A. EDERER  2,727,425
SHUTTLE LOCK
Filed Sept. 5, 1952  2 Sheets-Sheet 1
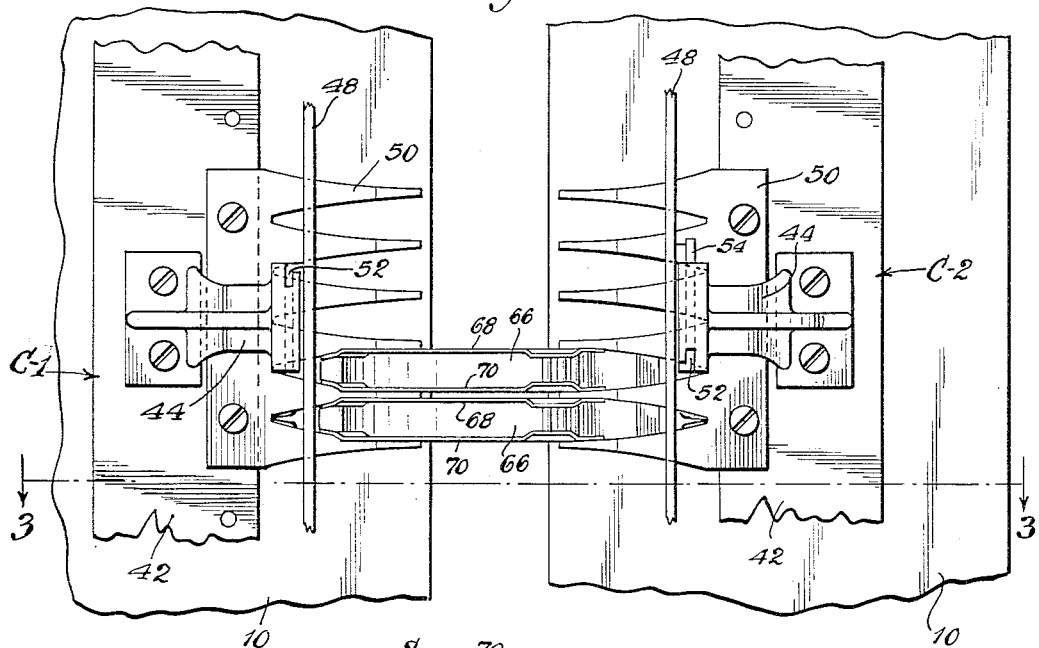
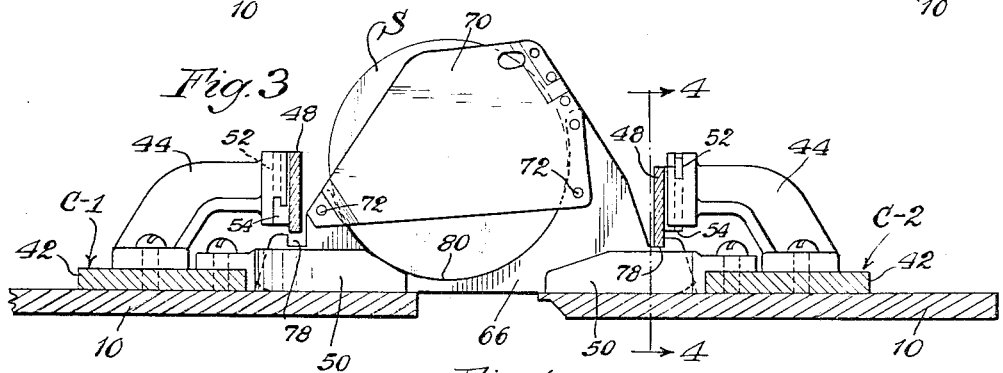
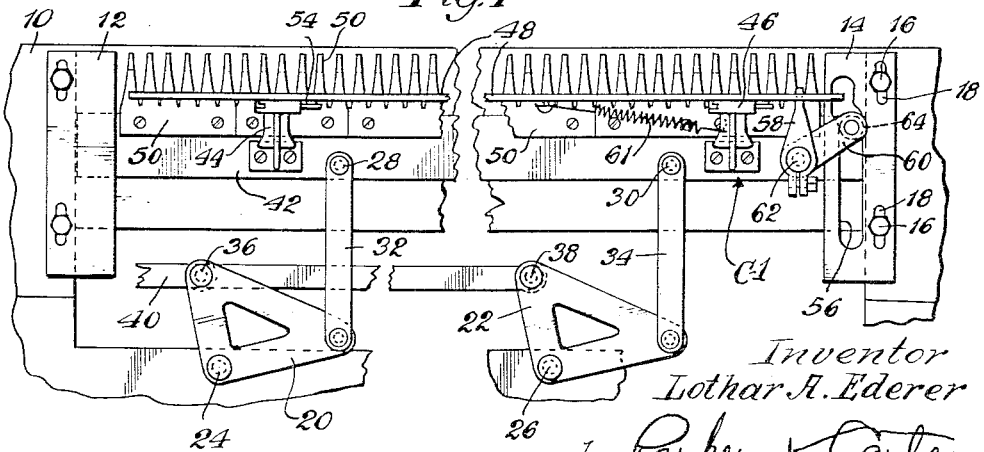
Inventor
Lothar A. Ederer
by Parker & Carter
Attorneys.

Dec. 20, 1955     L. A. EDERER     2,727,425
SHUTTLE LOCK
Filed Sept. 5, 1952     2 Sheets-Sheet 2
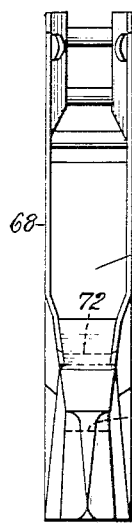
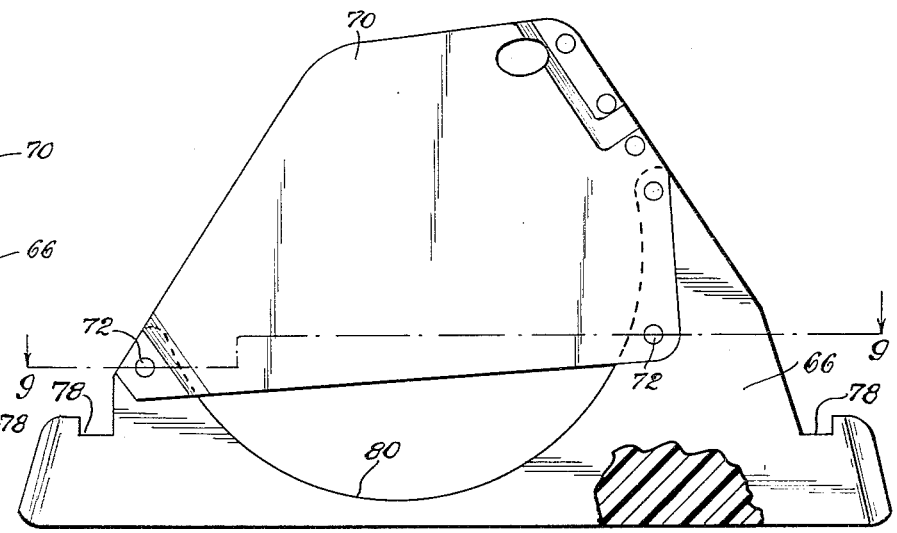
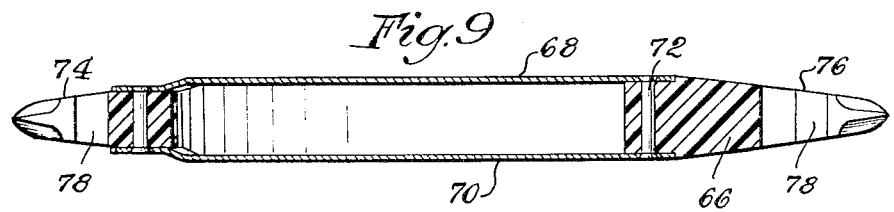
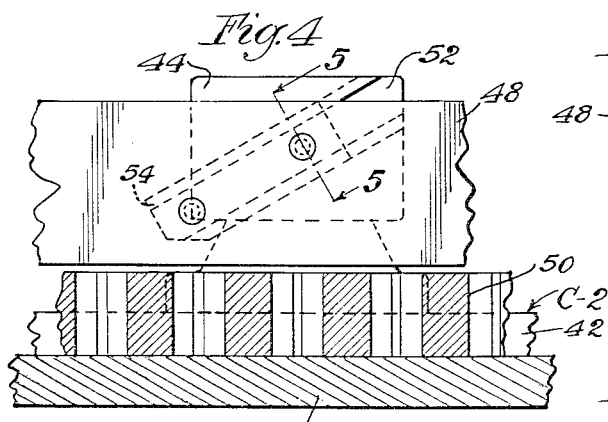
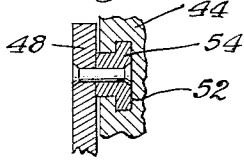
Inventor
Lothar A. Ederer
by Parker & Carter
Attorneys United States Patent Office 2,727,425
Patented Dec. 20, 1955

2,727,425

SHUTTLE LOCK

Lothar A. Ederer, Chicago, Ill., assignor, by mesne assignments, to The Linen Thread Co., Inc., Paterson, N. J., a corporation of Delaware Application September 5, 1952, Serial No. 308,046

7 Claims. (Cl. 87—54)

My invention resides in the field of fish net manufacturing and relates to a new and improved locking mechanism for the reciprocating shuttles in conventional net making machines.

In a conventional fish net making machine, a group of shuttles carrying bobbins are reciprocated back and forth in either a vertical or a horizontal direction from one carriage to another. These carriages, two in number, oppose each other and as one carriage picks up the shuttles pursuant to moving them across an operating station, the other carriage releases the group. Each carriage is provided with a locking mechanism so that when its turn comes to pick up the shuttles, it will firmly engage them and move them across the operating station. The shuttles must also be provided with a mating part on each of their ends to engage the respective locking mechanism on each of the carriages.

In prior fish net making machines the locking mechanism on the carriage has been composed of a bar movable in timed relationship with the operation of the machine and provided with a series of hooks or teeth which engage a mating part on the shuttles. The extremities of the shuttles are made up of a framework construction with large openings or perforations through which the hooks or teeth on the locking bar will pass when that particular carriage's turn comes to engage and hold or move the shuttles across the operating station. This type of mechanism has many disadvantages, the most obvious being the breakage of the teeth on the bar.

Therefore, the primary object of my invention is a new and improved locking mechanism for the shuttles so that they can be freely reciprocated back and forth from one side to another across the operating station in timed relationship with the operations of the machine.

Another object of my invention is the formation of the shuttles and combs on the carriages of a material which offers less resistance to the movement of the threads at the operating station while it is in contact with the shuttles so that the tendencies for snags or catches are greatly reduced, and the formation of lines or tight sections in the net is obviated.

Other objects will appear from time to time or be obvious in the ensuing specification and drawings in which:

Figure 1 is a plan view of one of the carriage mechanisms with its combs and toggle actuating mechanism;

Figure 2 is a plan view of two carriages opposing one another with a pair of shuttles between their combs;

Figure 3 is a side elevation taken partly in section along line 3—3 of Figure 2;

Figure 4 is a sectional view taken along line 4—4 of Figure 3;

Figure 5 is a sectional view taken along line 5—5 of Figure 4;

Figure 6 is a side view of a single shuttle showing its locking parts and the material of its construction;

Figure 7 is an end view of this shuttle;

Figure 8 is a bottom view of this shuttle, and

Figure 9 is a sectional view taken along line 9—9 of Figure 6.

In the Figures 1, 2, and 3, two carriages C–1 and C–2 oppose each other. These carriages are almost identical and a description will be given of only one of them as shown in Figure 1. This carriage C–1 is mounted on a base 10 and reciprocates between a pair of side guides 12 and 14. These guides are secured to the base by any conventional means such as bolts 16 extending through slots 18 so that each of the guides is adjustable. The carriage C–1 is reciprocated back and forth by any conventional mechanism such as a pair of toggles 20 and 22 pivoted at 24 and 26 respectively on the base 10 and connected to the carriage C–1 at 28 and 30 through a pair of pivoted links 32 and 34. Each of the toggles 20 and 22 are pivoted at 36 and 38 respectively to a common drive member 40 which is actuated in any conventional manner by the drive mechanism of the machine so that the carriage C–1 will be reciprocated back and forth between a forward and rearward position in timed relationship to the operation of the machine.

The carriage C–1 is provided with an extended support member 42 to which are attached two or more brackets 44 and 46. These brackets support a locking bar 48 which is adapted to engage mating parts on the shuttles so that at a predetermined time in the operation of the netting mechanism the shuttles will be grasped and locked by the locking bar so that when the carriage reciprocates to its rearward position, the shuttle will be withdrawn with it.

The forward edge of the extended support member 42 is provided with a plurality of combs 50, each of which has approximately six teeth as shown between which the tapered edge of the shuttles securely fit.

The locking bar can be raised and lowered from its locking to its unlocking position and is mounted so to do by a dove-tail slot 52 in each of the supporting brackets 44 and 46, as best shown in Figures 4 and 5. Note that these dove-tail slots are on an incline or are diagonally disposed across the face of the brackets 44 and 46. The locking bar 48 carries a plurality of T-shaped members, one for each of the brackets 44 and 46, and each of the T-shaped members 54 are diagonally disposed on the locking bar at the same angle as the dove-tail slot 52, so that as the bar is moved back and forth transversely, to the direction of movement of the carriage C–1, the T-shaped members will ride up and down in the diagonally disposed dove-tailed slot 52 so that the bar will be raised and lowered.

The mechanism for moving the bar in a transverse direction includes a cam slot 56 and a pair of levers 58 and 60 pivoted at 62 to the support member 42. A spring 61 is connected to the bracket 46 and the locking bar 48 so as to bias the bar at all times to the right in Figure 1. The lever 60 carries a cam follower 64 which rides in the cam slot 56. Levers 58 and 60 are non-rotatably mounted with respect to each other so that as lever 60 is rotated by its follower riding in the cam slot 56, lever 58 will be oscillated. The extremity of lever 58 fits in a slot in the locking bar 48 so that as the lever 58 is oscillated the bar will be moved transversely back and forth across the carriage thus raising and lowering it from its locking to its unlocking position.

Each of the shuttles, one being shown in Figures 6 through 9 inclusive, is composed of a body member 66 with a pair of side plates 68 and 70 which are secured to the body member 66 by a plurality of rivets 72. The bottom of the body member 66 is flat and smooth and is tapered at either end such as at 74 and 76 so that it will fit snugly into the combs 50 on each one of the carriages as shown in Figure 2. Each end of the body member 66 is provided with a notch 78 which is adapted to receive the locking bar. The material of body member 66 has been removed from between the side plates 68 and 70 in an arcuate form as at 80 so that the shuttle as a unit is adapted to receive a bobbin, such as shown in Figure 3 at S. In Figure 6 the upper right hand edges of the side plates 68 and 70 are depressed or stamped inwardly and secured together by two or more rivets as shown in Figure 7 so that a trough or slot is formed in the shuttle to receive the bobbin S.

Generally the body member 66 of the shuttle is made of metal, either cast iron, steel or the like, but this has been found unsatisfactory due to the fact that the entire shuttle has to pass through a loop formed in the thread at the working station, and the material of the shuttle has a tendency to stick or cling to the thread, and uneven patterns or lines will be formed in the net due to an uneven tensioning of the threads as they are knotted and woven together. To obviate this difficulty in the ultimate product, I have found that by making the body member 66 of a plastic material the threads at the working station have less tendency to stick to the shuttle and the ultimate pattern in the net is much smoother and a great deal more even. Also, those portions of the body member 66 adjacent the notches 78 are much more flexible and less brittle than their counterparts, namely, metal portions, so that when the notches are engaged by the locking bar, the material has a tendency to give rather than break which greatly prolongs the life of the shuttle.

In addition to plastic, I have found that a hard rubber material can be used very satisfactorily for the body member 66 as it will not cling to or snag the threads.

The use and operation of my device is as follows: A plurality of shuttles as shown in Figure 6 are positioned to be reciprocated across a working station, the working station being defined by a pair of base members 10, each base member movably supports a carriage. The carriages are adapted to be reciprocated back and forth by a driving mechanism between a forward and a rearward position. Each carriage carries a locking bar which engages a corresponding notch on each of the shuttles. The locking bars are raised and lowered by a stationary guide 14 having a cam slot 56 mounted on the base member 10 so that when the carriage moves forward the locking bar 48 will be raised due to the dove-tailed groove and slot connection as shown in Figures 4 and 5. The shuttles fit between the teeth on the combs 50 and upon the rearward movement of the carriage the slots 78 are engaged by the locking bar 48 and all of the shuttles are moved rearwardly with the carriage. During this movement of the shuttle it passes through a loop formed in the thread by various other mechanisms on the netting machine which forms no part of the present invention and has not been illustrated or described. When the carriage moves forward again carrying the shuttles, the opposite end of the shuttles are grasped by the opposite locking bar on the other carriage and thus the shuttles continue in their movement across the working stations to an extreme position with the second carriage. As shown in Figure 3, the shuttles are moved from an extreme left to an extreme right position being transferred from carriage C-1 to carriage C-2. Reversely the carriage C-2 then returns the shuttle leftwardly to the carriage C-1 which picks them up through the locking bar and takes them to an extreme left-hand position.

It should be understood that each of the carriages C-1 and C-2 are provided with a toggle actuating mechanism and a slotted cam and its accompanying mechanism for raising and lowering the locking bars such as shown in Figure 1.

If the shuttles are made of plastic I have found that it is advantageous to make the combs also of plastic so that as snug and even a fit as possible is acquired between the tapered end of the shuttle and the combs. This produces a more homogeneous locking and unlocking of the shuttles by the locking mechanism and completely obviates any tendency of the shuttles to stick in the combs.

While I have described and shown a preferred form of my invention it should be understood that numerous changes may be made without departing from the fundamental theme or essence of the invention, and the above disclosure should only be taken as illustrative and diagrammatic and not to restrict the invention except as by the appended claims.

I claim:

1. In a device for making nets comprising a base, a carriage movably mounted on such base and adapted to be moved to and from a working station, a locking bar mounted on said carriage, a plurality of shuttles movable to and through the working station, each shuttle containing a mating portion adapted to be fixedly engaged by the locking bar, means for operating the carriage in timed relationship to the operation of the device, and means on the base adapted to raise the locking bar when it is in its extreme position adjacent the working station and to lower the locking bar when it is away from the working station.

2. In a device for making nets comprising a base, a carriage movably mounted on such base and adapted to be moved to and from a working station, a locking bar mounted on said carriage, a plurality of shuttles movable to and through the working station, each shuttle containing a mating portion adapted to be fixedly engaged by the locking bar, means for operating the carriage in timed relationship to the operation of the device, and means on the base adapted to raise the locking bar when it is in its extreme position adjacent the working station and to lower the locking bar when it is away from the working station, the mating portion on a shuttle including a slot disposed so as to open upwardly.

3. In a device for making nets comprising a base, a carriage movably mounted on such base and adapted to be moved to and from a working station, a locking bar mounted on said carriage, a plurality of shuttles movable to and through the working station, each shuttle containing a mating portion adapted to be fixedly engaged by the locking bar, means for operating the carriage in timed relationship to the operation of the device, and means on the base adapted to raise the locking bar when it is in its extreme position adjacent the working station and to lower the locking bar when it is away from the working station, the locking bar being provided with a mounting on the carriage so that it can move both vertically and horizontally at the same time.

4. In a device for making nets comprising a base, a carriage movably mounted on such base and adapted to be moved to and from a working station, a locking bar mounted on said carriage, a plurality of shuttles movable to and through the working station, each shuttle containing a mating portion adapted to be fixedly engaged by the locking bar, means for operating the carriage in timed relationship to the operation of the device, and means on the base adapted to raise the locking bar when it is in its extreme position adjacent the working station and to lower the locking bar when it is away from the working station, the locking bar being provided with a mounting on the carriage so that it can move both vertically and horizontally at the same time, the locking bar mounting being composed of at least one diagonally disposed dove-tailed slot on the carriage and a diagonally disposed T-shaped member on the locking bar so that as the locking bar is moved transversely with relation to the movement of the carriage it will be raised and lowered.

5. In a device for making nets comprising a base, two carriages movably mounted on said base, said carriages being disposed opposite one another and describing a working station; each carriage being adapted to move to and from the working station, a locking bar mounted on each carriage and adapted to be moved vertically with relation to the carriage, a plurality of shuttles movable to and through the working station, each shuttle containing mating portions adapted to be fixedly engaged by the locking bars on the carriages, means for reciprocating the carriages to and from the working station in timed relationship to the operation of the device, and means on the base adapted to move the locking bars vertically so as to engage and disengage the mating portions on the shuttles only in the forward position of each carriage adjacent the working station.

6. In a device for making nets comprising a base, two carriages movably mounted on said base, said carriages being disposed opposite one another and describing a working station; each carriage being adapted to move to and from the working station, a locking bar mounted on each carriage and adapted to be moved vertically with relation to the carriage, a plurality of shuttles movable to and through the working station, each shuttle containing mating portions adapted to be fixedly engaged by the locking bars on the carriages, means for reciprocating the carriages to and from the working station in timed relationship to the operation of the device, and means on the base adapted to move the locking bars vertically so as to engage and disengage the mating portions on the shuttles only in the forward position of each carriage adjacent the working station, the mating portions on each of the shuttles being composed of a slot on each end thereof disposed so as to open upwardly and adapted to receive the locking bar when the same is moved downwardly upon withdrawal of the carriage from the working station.

7. In a machine for making nets comprising a base defining a working station, two carriages movably mounted on said base, one on each side of the working station and adapted to be moved to and from the working station, means for moving the carriages to and from the working station in timed relationship to the operation of the machine, each carriage having a locking bar structure adapted to be moved from a locking to an unlocking position, means on the base adjacent the working station for moving the locking bar structure from its locking to its unlocking position when a carriage is positioned adjacent the working station, mounting means between the locking bar structure and the carriage composed of at least one dove-tailed slot on the carriage and a T-shaped element on the locking bar structure, both being disposed at an inclined angle with relation to the plane of the carriage, a plurality of shuttles adapted to be shifted from one carriage to the other so as to reciprocate back and forth across the working station, and means on each end of the shuttles adapted to mate with the locking bar structure so as to lock the shuttles in a fixed relationship with relation to either carriage, said means including a slot on each end of the shuttles disposed upwardly so as to open in a vertical direction.

References Cited in the file of this patent

UNITED STATES PATENTS

| 233,033 | Sedgwick | Oct. 5, 1880 |
| 843,487 | Pare | Feb. 5, 1907 |
| 1,268,144 | Pare | June 4, 1918 |
| 2,445,899 | Williams | July 27, 1948 |
| 2,470,391 | Daniello | May 17, 1949 |
| 2,619,988 | Pelce | Dec. 2, 1952 |

FOREIGN PATENTS

| 23,124 | Great Britain | of 1912 |